United States Patent [19]

Watanabe

[11] Patent Number: 4,709,136
[45] Date of Patent: Nov. 24, 1987

[54] IC CARD READER/WRITER APPARATUS

[75] Inventor: Hiroshi Watanabe, Kokubunji, Japan

[73] Assignee: Toppan Moore Company, Ltd., Tokyo, Japan

[21] Appl. No.: 870,102

[22] Filed: Jun. 3, 1986

[30] Foreign Application Priority Data

Jun. 4, 1985 [JP] Japan .................................. 60-121083

[51] Int. Cl.⁴ ............................................ G06F 15/30
[52] U.S. Cl. ...................................... 235/379; 235/380
[58] Field of Search ................................. 235/379, 380

[56] References Cited

U.S. PATENT DOCUMENTS 4,594,663  6/1986  Nagata .................................. 235/380

Primary Examiner—Harold I. Pitts
Attorney, Agent, or Firm—Kenyon & Kenyon

[57] ABSTRACT

An IC card reader/writer apparatus includes at least two contactors in which IC cards are inserted, respectively, card detecting means for detecting that at least two IC cards have been loaded, and collating means for verifying that correct cipher codes of the two IC cards coincide with those inputted externally, respectively, wherein access to the contents stored in the IC cards is allowed only when the collation results in coincidence.

2 Claims, 4 Drawing Figures

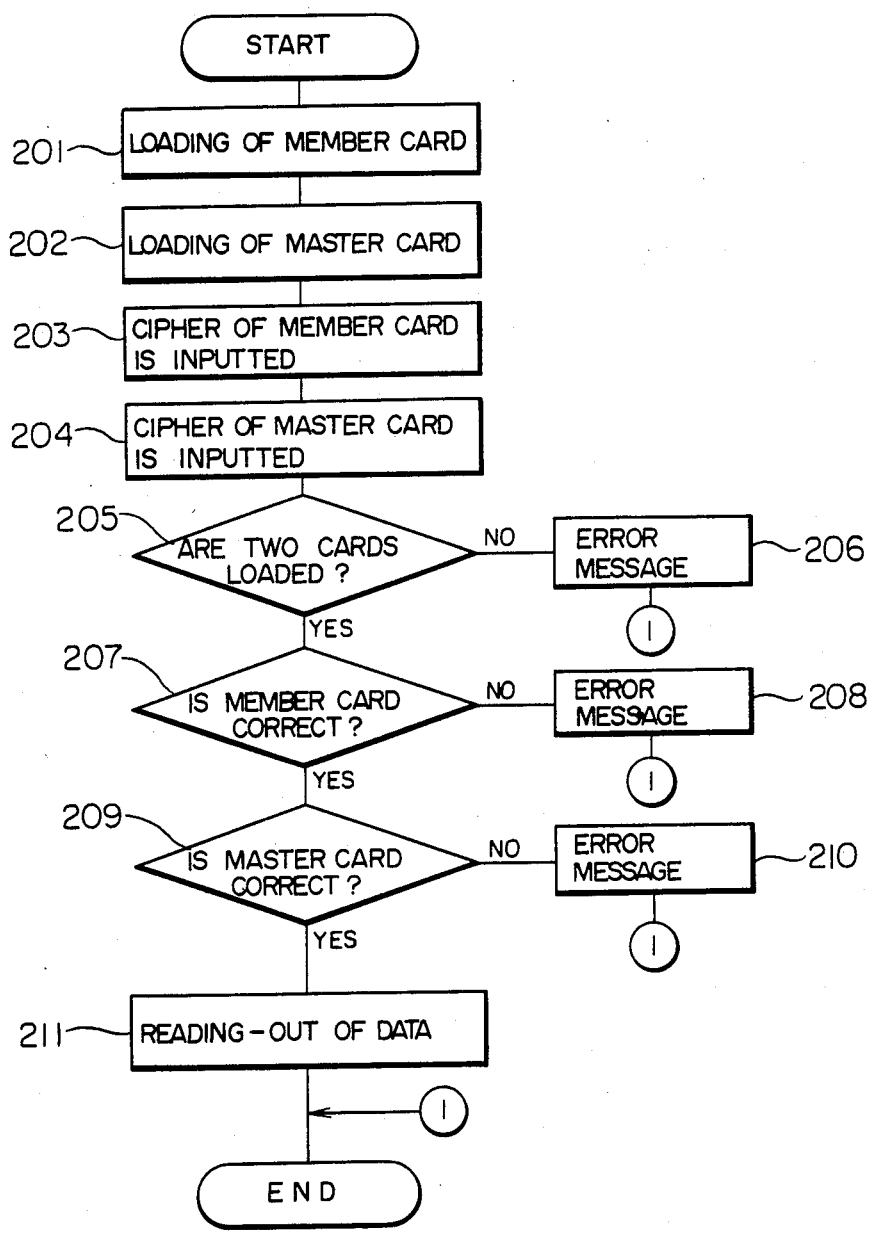

IC CARD READER/WRITER APPARATUS

BACKGROUND OF THE INVENTION

1. Field of the Invention

The present invention generally relates to an IC card reading or reading and writing apparatus (hereinafter referred to as IC card reader/writer apparatus) which is adapted for reading or writing information or data from or in IC cards each incorporating semiconductor circuits such as a microprocessor, memories and others. More particularly, the invention concerns an IC card reader/writer apparatus which can assure high security of information contained in the IC cards by adopting such an arrangement that reading or writing of desired information is not allowed to be carried out unless two or more cards are inserted in the apparatus.

2. Description of the Related Art

In general, the IC card reader/writer apparatus is implemented in such a structure in which after loading of an IC card in the apparatus in an inserting port (referred to as contactor), cipher code or password (e.g. a string of numerals or symbols or combination thereof) only known to the card holder or user is inputted to the apparatus, being followed by comparison of the inputted cipher code with a relevant cipher code stored in the card or a host computer to which the card reader/writer apparatus is connected, wherein upon coincidence in the comparison, the writing of data (information) in the card or the reading of the data from the card is permitted. The hitherto known reader/writer apparatus is equipped with only one contactor. Consequently, when the card reader/writer apparatus is employed in an information management system in which a plurality of card holders or users are registered, the processing for writing or reading data in or from a single card is carried out individually independent of the cards owned by the other card holders.

As a typical example of the information management system, there can be mentioned an overall medical management system in which information concerning health condition, case histories, results of inspections, contents of diagnoses, medications and dosages and the like of a person or patient is recorded in an IC card. On the side of the patient, the card is made use of for the purpose of management of his or her health, the recording of medical payment and others, while on the side of the doctor, the card is utilized for recording or retrieving data for medical treatment, calculating the amount of medical fee, accounting and the like.

In the card management system of the type described above, it is not permitted from the stand point of securing the privacy and in view of the monetary contents of the card that anyone can write or read freely the diagnostic data or medication data in or from the card without authorization, but strict maintenance of the security of the information is required.

In the case of the hitherto known IC card reader/writer apparatus employed in the card management system, the patient and the doctor possess respective IC cards, and both parties can write or read the data of the kinds mentioned above in or from their own cards, respectively, independent of each other. In other words, the reader/writer apparatus is equipped with only one contactor and so designed as to be capable of processing the data of a single card without regard to the other card. Under the circumstances, there may arise such cases in which the medication data and treatment data are written in the doctor's card without being known to the patient who is thus compelled to make undue payment or in which the data concerning a patient are read out by using the doctor's card without encountering any restriction in a hospital, giving rise to a problem that the security of the information might be endangered. In addition to the overall medical management system mentioned above, there are also known commercial transaction management systems used in retail stores as well as wholesale shops in which customers have respective cards for recording the amounts of purchases day by day for settling accounts at a time later on. In the case of this system, the data of the amounts recorded in the IC card prepared for each customer and managed by the store must necessarily coincide with the data recorded in the IC card possessed by the customer. Accordingly, the card management system has to be so implemented that one party can not freely make access to the contents stored in the card without authorization of the other party. However, in the case of the system in which the hitherto known card reader/writer apparatus each equipped with only one contactor are employed, there exists a possibility that one party may perform modification or alteration of the data contents stored in the card intentionally or accidentally without being authorized by the other party. Thus, there exists a problem concerning the security of the information stored in the IC card.

SUMMARY OF THE INVENTION

With a view to solving the problem of the security of information, there is proposed according to an aspect of the present invention an IC reader/writer apparatus which includes at least two IC card inserting ports (openings for receiving the cards and referred to as the contactors), means for detecting insertion of the IC cards in the inserting ports, respectively, means for detecting that all of the inserting ports are loaded with the IC cards, respectively, and means for collating or verifying cipher codes of the loaded IC cards, wherein arrangement is made such that only when all the inserting ports are loaded with the IC cards, respectively, and when the cipher codes of the inserted cards are successfully collated, the writing and/or reading of data in or from the IC cards is admitted.

By way of example, in the case of the aforementioned overall medical management system, access to the cards for the data processing is allowed only after both of the patient's card and the doctor's card have been loaded in the card reader/writer apparatus and the cipher codes of both the cards have been successfully collated. In this manner, it is rendered impossible for only one of the concerned parties to perform the data processing by using the IC card reader/writer apparatus.

DESCRIPTION OF THE DRAWINGS

FIG. 4 shows a flow chart for illustrating a procedure of reading data from IC cards by using the apparatus according to the invention.

DESCRIPTION OF THE PREFERRED EMBODIMENTS

Figure 1:
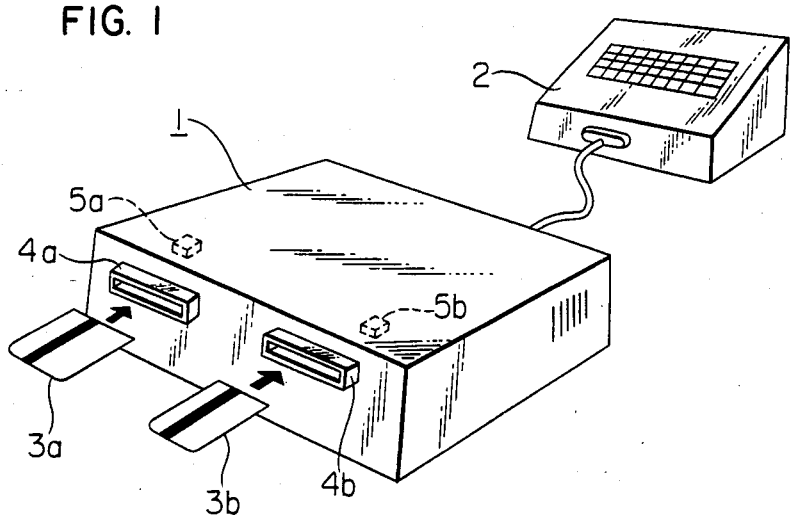
FIG. 1 is a view showing an outer appearance of the IC card reader/writer apparatus according to an exemplary embodiment of the present invention.

Now, the invention will be described in more detail. It should be first mentioned that the number of the card inserting ports or contactors provided for an IC card reader/writer apparatus can be selected appropriately in accordance with the requirements imposed on the information management system to which the card reader/writer apparatus belongs. When the number of the contactors is increased and all of the contactors must be loaded with the IC cards before the access to the data is admitted, the security of the information stored in the IC cards can be increased drastically. Of course, so far as two or more contactors are provided, arrangement may be made such that the access to data carried by the cards is admitted only when the IC cards are inserted into at least two contactors, respectively. The number of the contactors as well as the number of the IC cards which can undergo the data processing may be determined in dependence on the design of the card management system.

Now, description will be made on the data writing and reading operation on the assumption that two contactors (i.e. the card inserting or loading ports) are provided in the card reader/writer apparatus. First assuming that the data writing operation is to be performed, two IC cards are first inserted into two contactors, respectively, being followed by the inputting of the respective cipher codes externally through a keyboard, whereupon the card insertion detecting means produces an output signal indicating that the IC card has been inserted. When both the card insertion detecting means provided in association with the two card contactors produce the output signals, respectively, it is verified that two IC cards have been placed within the respective contactors. If only one card is inserted, then an error display is generated, to inhibit any further processing from proceeding with so long as another card is not inserted. Subsequently, the cipher codes stored in both cards are collated with the inputted cipher codes. When the collation or comparison results in coincidence, inputting of desired data is admitted. Otherwise, the error display is generated. The data can be inputted in the card reader/writer apparatus through a keyboard provided in association with a host computer. However, the data as inputted is not immediately written in the IC card but stored temporarily in the host computer or a memory incorporated in the card reader/writer apparatus. Next, it is again checked whether or not two cards are present for the purpose described herein after. If this condition is not met, an error message or display is generated to inhibit any further processing from proceeding with. When it is confirmed that two cards are both in place, the cipher codes of these cards are collated in the manner described above. When it is confirmed that both cards are correct, the data as inputted are admitted to be written in both the cards.

Operation for reading out data from the IC card is performed substantially in the same manner as with the case of the data writing operation described above. Namely, upon reading of the desired data, both the IC cards are loaded in the reader/writer apparatus, while the cipher codes thereof are inputted externally. After the insertion of the two cards has been detected and after the cipher codes have been successfully collated, the data can be read out from the cards. Needless to say, unless both the cards are not inserted or when the inputted cipher codes do not coincide with those stored in the cards, error display or message is generated to inhibit any further processing or operation. The operation described above is essentially same even in the case where the contactors are provided in a number greater than two.

As will be appreciated from the above description, the present invention teaches that at least two contactors are provided for the IC card reader/writer apparatus and that only when the cipher codes stored in the cards inserted in at least two contactors coincide with the cipher codes as inputted externally, the writing and/or reading of data in or/from the cards is admitted. By virtue of this feature, the possibility of the information stored in the card being processed by the card holder of one party without getting authorization from the other party can be positively precluded, whereby the security of the information carried by the card can be significantly enhanced.

Further, it will be understood that according to the teaching of the present invention, the security of information stored in the IC cards can be increased more significantly, as the number of the cards which can be processed in the IC card reader/writer apparatus is increased. By selecting the number of the cards and that of the contactors appropriately, the card management system can be implemented in various configurations in consideration of the security as desired and the fields or modes in which the system is utilized, allowing thus high freedom in designing the data management system in which the card reader/writer apparatus according to the invention can be employed.

In the following, an exemplary embodiment of the present invention will be described in more detail by referring to the accompanying drawings.

FIG. 1 is a view showing an outer appearance of a card reader/writer apparatus 1 according to an embodiment of the present invention together with a host computer 2 equipped with a keyboard. As will be seen in the figure, IC cards $3a$ and $3b$ are inserted in contactors (i.e. card loading or inserting ports) $4a$ and $4b$, respectively. Disposed internally of the contactors $4a$ and $4b$ are card sensors $5a$ and $5b$, respectively, for sensing or detecting the insertion or presence of the cards in the associated contactors. The card sensor may be constituted by a mechanical switch such as, for example, a micro-switch actuated in response to the contact with the card or photo-sensor for optically detecting the presence of the card. Each of the cards has externally exposed terminals (not shown) electrically connected to the microprocessor and memory incorporated in the card. Provided in the interior of each contactor are terminals in an array corresponding to that of the card and connected to the circuits disposed internally of the card reader/writer apparatus. It will be noted that when the card is placed in the associated contactor, the terminals of the inserted card are brought into electrical contact with those of the contactors. The card sensor may be so disposed as to detect the presence of the card placed in the state mentioned above. Alternatively, the sensor may be mounted in such an arrangement that the presence of the card can be verified by detecting the reading out of the cipher code from the card. The host computer 2 equipped with the keyboard serves to input data as well as instructions or commands for the data reading-out or writing-in operation. The host computer 2 of this kind may be constituted by any suitable commercially available computer such as, for example, a so-called personal computer which has the keyboard mounted integrally therein or provided separately and connected thereto through signal lines. Alternatively, the reader/writer apparatus may be realized in an integral structure with the computer 2 and the keyboard.

Figure 2:
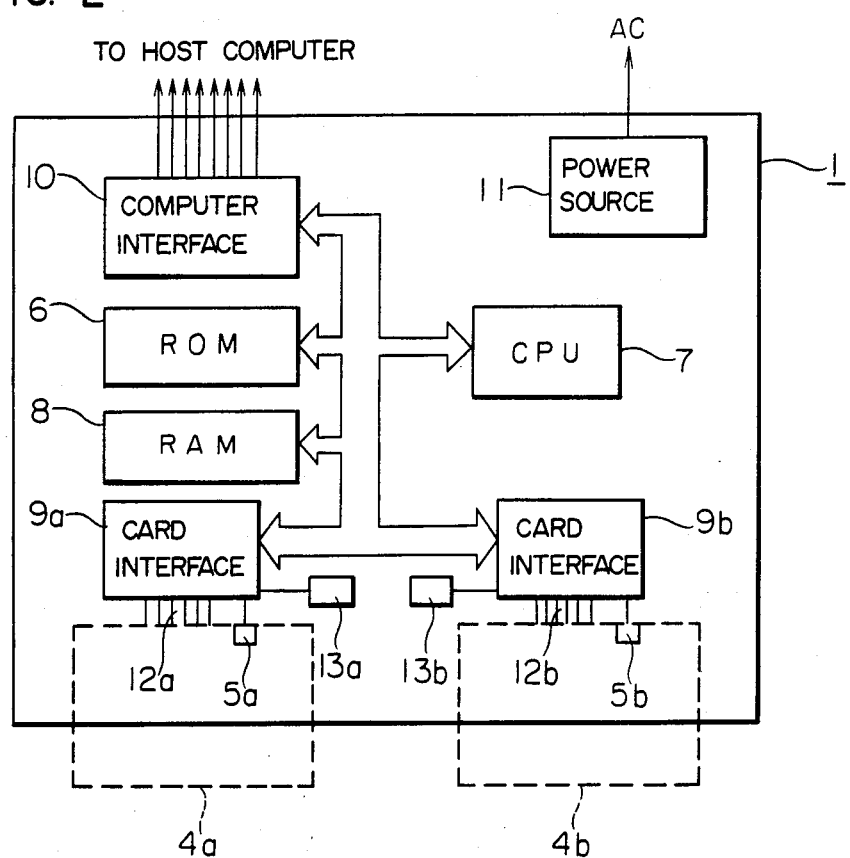
FIG. 2 is a block diagram showing an arrangement of an electrical circuit incorporated in the IC card reader/writer apparatus.

FIG. 2 is a block diagram showing a circuit arrangement incorporated in the IC card reader/writer apparatus which is assumed to be provided with two contactors (card inserting ports) according to an embodiment of the invention. In FIG. 2, reference numerals 4a and 4b denote the contactors in which the IC cards are inserted, respectively, and in which the card sensors 5a and 5b are disposed to detect the insertion or presence of the cards. The terminals (not shown) of the card are brought into electrical contact with the terminals 12a and 12b provided in the contactors to be electrically connected to the internal circuit of the card reader/writer apparatus. A ROM (abbreviation of read-only memory) 6 stores therein a program for controlling the data reading/writing operation performed onto the cards. A CPU (central processing unit) 7 includes an arithmetic unit and others for executing the program mentioned above. A RAM (random access memory) 8 serves to store temporarily the data in the course of the reading/writing processing, as occasion requires. Card interfaces 9a and 9b serve as the interfaces between the IC cards and the reader/writer apparatus and has the terminals 12a and 12b adapted to be brought into contact with those of the cards. Further, the card sensors 5a and 5b and buzzers 13a and 13b are connected to the interfaces 9a and 9b, respectively. The buzzers 13a and 13b serve to generate audible error messages for alarming the operator, as will be described hereinafter. To this end, a light emitting display device or a device capable of displaying error information in the form of a character string may be employed in place of the audible error generating device. A reference numeral 10 denotes an interface for realizing communication between the host computer (inclusive of the keyboard) and the card reader/writer apparatus. A reference numeral 11 denotes a power supply source for supplying electric power to the individual components of the card reader/writer apparatus, the power source being connected to an external AC power source.

Figure 3:
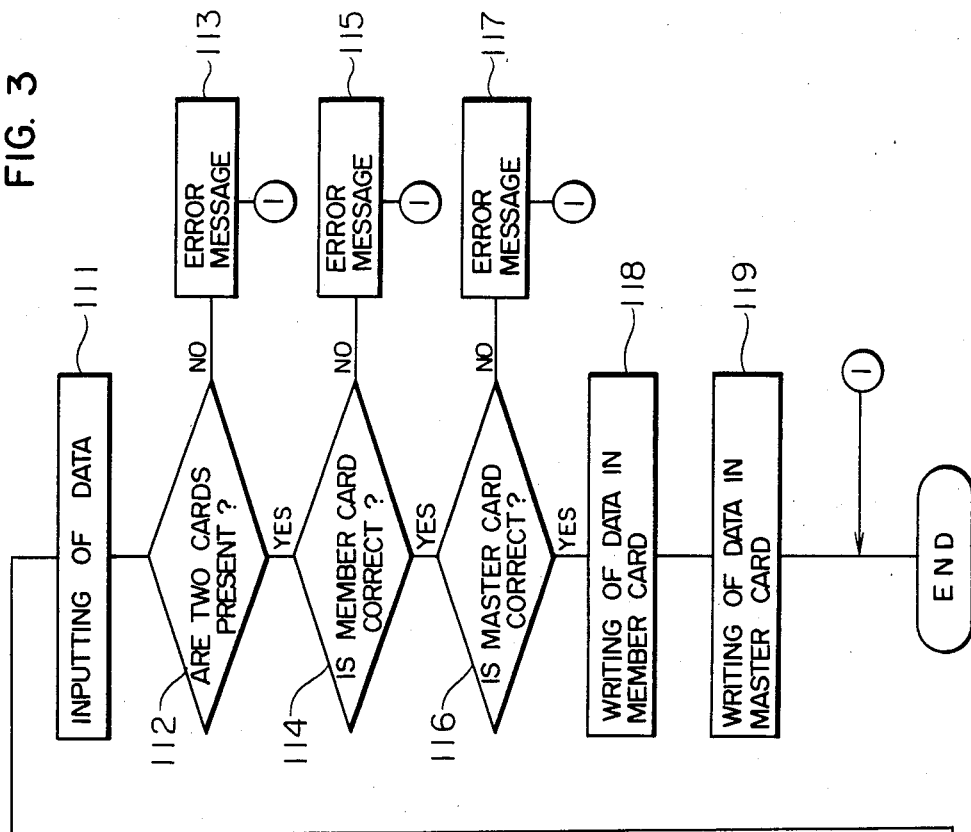
FIG. 3 shows a flow chart for illustrating a procedure of writing data in IC cards by using the card reader/writer apparatus according to the present invention.
Figure 3:
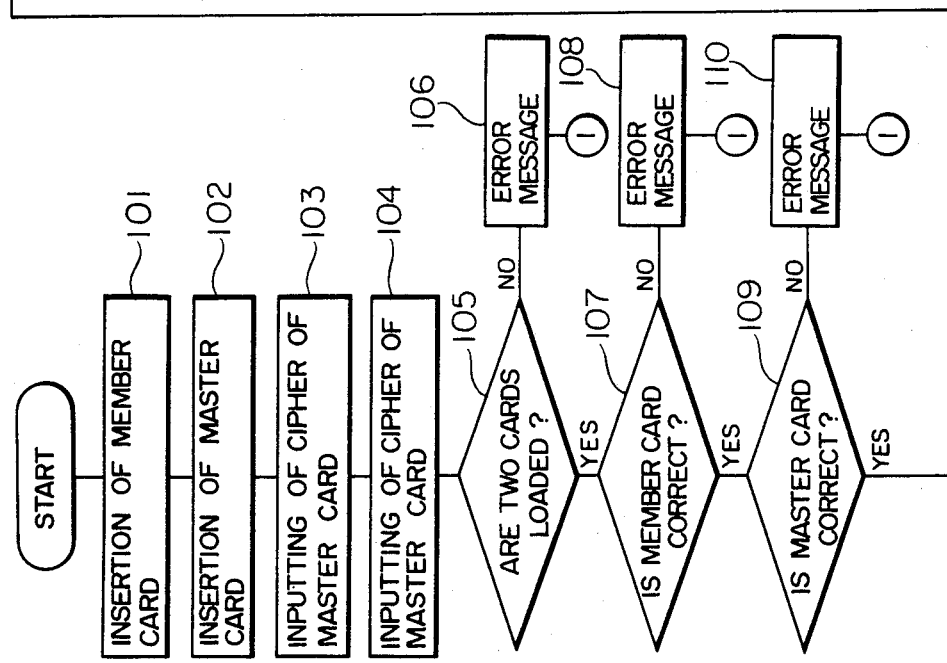

Next, operation of the illustrative system will be described by referring to FIGS. 3 and 4. FIG. 3 illustrates in a flow chart a processing for writing data in the IC cards. For the convenience of description, the two cards will be referred to as the master card and the member card, respectively. In the exemplary case of the aforementioned overall medical management system, the master card corresponds to the doctor's card while the member card corresponds to the patient's card.

At first, the processing for writing data is commanded in the host computer. At a step 101, the member card is loaded in one of the contactors. Subsequently, at a step 102, the master card is loaded in the other contactor. At a next step 103, the cipher code of the member card is inputted through the keyboard of the host computer 2, being followed by a step 104 where the cipher code of the doctor card is inputted. At a step 105, it is checked whether or not the card sensors 5a and 5b are producing output signals (i.e. whether the cards are in place). In case the two cards are both not inserted, an error display or message is produced at a step 106, as a result of which one of the buzzers 13a and 13b associated with the contactor having no card inserted is activated to alarm the operator of the error. At a step 107, the cipher or password code stored in the member card is compared with the one inputted through the keyboard at the step 103. If the comparison results in discrepancy, an error message is generated to activate the buzzer at a step 108. When the comparison at the step 107 results in coincidence, the program proceeds to a step 109 where the cipher code recorded in the master card is compared with the one inputted at the step 104. If discrepancy is found, a corresponding error message or display is generated. Upon coincidence, the program proceeds to a step 111 where the state ready for receiving the data is established. Accordingly, at the step 111, the date (e.g. contents of treatments, medication or dosage) is inputted through the keyboard. This data is temporarily stored in the RAM 8 of the card reader/writer apparatus. In precaution against the case where one of the cards might be extracted or replaced by another one in the course of the data inputting process mentioned above, it is again checked whether the two cards are present or not at a step 112, being followed by steps 114 and 116 where the cipher codes of the member card and the master card are again collated, respectively. Unless the two cards are present or discrepancy is found in the collation of the cipher codes of the member card or the master card, then the corresponding error message is produced. In succession to the step 116 where the correct cipher code of the master card is confirmed, the data inputted at the step 111 is written in a recording area of the member card at a time at a step 118. Next, at a step 119, the same data is written in the master card. For writing additional data, the aforementioned procedure beginning with the step 111 may be repeated.

FIG. 4 shows in a flow chart a procedure for reading out data from the IC cards. In the first place, designation of the data to be read out and the reading command are issued in the host computer. At a step 201, the member card is inserted in one of the contactors. At a step 202, the master card is inserted into the other contactor. At steps 203 and 204, the cipher codes allocated to the member card and the doctor card are inputted, respectively, to be subsequently stored in the RAM 8 of the reader/writer apparatus. Next, at a step 205, it is checked whether both cards have been inserted. If not, an error message is generated. Otherwise, the procedure proceeds to a step 207 where the cipher code stored in the member card is compared with the one inputted at the step 203. If the comparison results in discrepancy, an error display is generated. Otherwise, a step 209 is executed to compare the cipher code stored in the master card with the one inputted at the step 204. If discrepancy is found, an error message is issued. Otherwise, the data as designated is allowed to be read out at a step 211.

As will be appreciated from the foregoing description, the present invention can be applied to either the IC card reader designed only to read out information or the IC card reader and writer apparatus designed to perform both of information reading and writing operations. Accordingly, the terms "IC card reader/writer apparatus" as herein used should be interpreted to encompass both the apparatus mentioned above. In the case of the card reader apparatus, one of the parties registered in the management system in which the apparatus is employed is not allowed to read out the information from the card without authorization of the other party, because the reading-out of data from the card of one party necessarily requires the presence of the card of the other counterpart party in the card reader, whereby the security of the information stored in the card can be significantly enhanced.

What is claimed is:

1. An IC card reader apparatus in which information stored in IC cards placed in said apparatus is allowed to be read out by inputting cipher codes specific to said IC cards, comprising:

at least two card inserting ports for receiving IC cards, respectively;

means for detecting the insertion of said IC cards in said ports;

means for determining whether said insertion detecting means has detected the presence of said IC cards at least at said two inserting ports;

collating means for verifying whether cipher codes allocated to said two IC cards placed in said inserting ports coincide with the inputted cipher codes, respectively; and means for permitting information to be read out from said IC cards only when said determining means has confirmed the presence of said IC cards at least at said two inserting ports and when the cipher codes of said two IC cards whose presence at said two inserting ports has been confirmed coincide with said inputted cipher codes, respectively.

2. An IC card reader and writer apparatus in which information stored in IC cards placed in said apparatus is allowed to be read out or information is allowed to be stored in said IC cards placed in said apparatus by inputting cipher codes specific to said IC cards, respectively, comprising:

at least two card inserting ports for receiving said IC cards, respectively;

means for detecting the insertion of said IC cards in said ports;

means for determining whether said insertion detecting means has detected the presence of said IC cards at least at said two inserting ports;

collating means for verifying whether the cipher codes allocated to said two IC cards placed in said inserting ports coincide with said inputted cipher codes, respectively; and means for permitting information to be read out from or written in said IC cards only when said determining means has confirmed the presence of said IC cards at least at said two inserting ports, respectively, and when the cipher codes of said two IC cards whose presence at said two inserting ports has been confirmed coincide with said inputted cipher codes, respectively.

* * * * *